(12) United States Patent
Tester et al.

(10) Patent No.: US 10,497,358 B2
(45) Date of Patent: Dec. 3, 2019

(54) TRANSDUCER DRIVER

(71) Applicant: ULTRAHAPATICS IP LTD, Bristol (GB)

(72) Inventors: David Philip Tester, Cambridge (GB); Benjamin John Oliver Long, Bristol (GB)

(73) Assignee: Ultrahaptics IP Ltd, Bristol (GB)

( * ) Notice: Subject to any disclaimer, the term of this patent is extended or adjusted under 35 U.S.C. 154(b) by 0 days.

(21) Appl. No.: 15/851,214

(22) Filed: Dec. 21, 2017

(65) Prior Publication Data
US 2018/0182372 A1 Jun. 28, 2018

Related U.S. Application Data

(60) Provisional application No. 62/438,755, filed on Dec. 23, 2016.

(51) Int. Cl.
| | | |
|---|---|---|
| *G10K 11/34* | (2006.01) | |
| *G06F 3/043* | (2006.01) | |
| *H01G 4/002* | (2006.01) | |
| *H02M 1/096* | (2006.01) | |

(Continued)

(52) U.S. Cl.
CPC .......... *G10K 11/346* (2013.01); *B06B 1/0207* (2013.01); *G06F 3/0436* (2013.01); *H01G 4/002* (2013.01); *H02M 1/096* (2013.01); *H02M 1/16* (2013.01)

(58) Field of Classification Search
CPC ..... G10K 11/346; H01G 4/002; H02M 1/096; H02M 1/16; B06B 1/0207
See application file for complete search history.

(56) References Cited

U.S. PATENT DOCUMENTS

| | | |
|---|---|---|
| 4,218,921 A | 8/1980 | Oran et al. |
| 4,771,205 A | 9/1988 | Mequio |
| 4,881,212 A | 11/1989 | Takeuchi |

(Continued)

FOREIGN PATENT DOCUMENTS

| | | |
|---|---|---|
| CN | 102591512 | 7/2012 |
| CN | 103797379 | 5/2014 |

(Continued)

OTHER PUBLICATIONS

Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).

(Continued)

*Primary Examiner* — Lisa M Caputo
*Assistant Examiner* — Jamel E Williams
(74) *Attorney, Agent, or Firm* — Koffsky Schwalb LLC; Mark I. Koffsky

(57) ABSTRACT

A circuit for driving a transducer in a mid-air haptic system includes a voltage source, a voltage sink, a current source, a trickle capacitor, a storage capacitor, a haptic system transducer, a first switch, a second switch, and a third switch. Using these components, a portion of the charge required for switching a transducer is sourced from the decoupling capacitance. When the switching completes, additional charge is transferred immediately from the power supply back into the decoupling capacitance. This acts to lower the peak current by fully utilizing 100% of a switching waveform for transfer of charge from the power supply to capacitors local to the transducer.

20 Claims, 3 Drawing Sheets

(51) Int. Cl.
*H02M 1/16* (2006.01)
*B06B 1/02* (2006.01)

(56) References Cited

U.S. PATENT DOCUMENTS

| | | |
|---|---|---|
| 5,329,682 A | 7/1994 | Thurn |
| 5,426,388 A | 6/1995 | Flora et al. |
| 5,511,296 A | 4/1996 | Dias |
| 6,503,204 B1 | 1/2003 | Sumanaweera et al. |
| 6,647,359 B1 | 11/2003 | Verplank |
| 6,772,490 B2 | 8/2004 | Toda |
| 6,800,987 B2 | 10/2004 | Toda |
| 7,225,404 B1 | 5/2007 | Zilles et al. |
| 8,279,193 B1 | 10/2012 | Birnbaum |
| 8,607,922 B1 | 12/2013 | Werner |
| 8,884,927 B1 | 11/2014 | Cheatham, III |
| 9,208,664 B1 | 12/2015 | Peters et al. |
| 9,612,658 B2 | 4/2017 | Subramanian |
| 9,841,819 B2 | 12/2017 | Carter |
| 9,945,818 B2 | 4/2018 | Ganti |
| 2003/0024317 A1 | 2/2003 | Miller |
| 2003/0144032 A1 | 7/2003 | Brunner et al. |
| 2004/0014434 A1 | 1/2004 | Haardt |
| 2004/0091119 A1 | 5/2004 | Duraiswami et al. |
| 2004/0226378 A1 | 5/2004 | Oda |
| 2005/0212760 A1 | 9/2005 | Marvit |
| 2006/0085049 A1 | 4/2006 | Cory et al. |
| 2006/0091301 A1 | 5/2006 | Trisnadi |
| 2007/0177681 A1 | 8/2007 | Choi et al. |
| 2008/0012647 A1 | 1/2008 | Risbo et al. |
| 2008/0273723 A1 | 11/2008 | Hartung et al. |
| 2008/0300055 A1 | 12/2008 | Lutnick |
| 2009/0093724 A1 | 4/2009 | Pernot et al. |
| 2010/0013613 A1 | 1/2010 | Weston |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0262008 A1 | 10/2010 | Roundhill |
| 2011/0051554 A1 | 3/2011 | Varray et al. |
| 2011/0199342 A1 | 8/2011 | Vartanian et al. |
| 2011/0310028 A1 | 12/2011 | Camp, Jr. |
| 2012/0063628 A1 | 3/2012 | Rizzello |
| 2012/0223880 A1 | 9/2012 | Birnbaum |
| 2012/0229401 A1 | 9/2012 | Birnbaum et al. |
| 2012/0299853 A1 | 11/2012 | Dagar |
| 2012/0307649 A1 | 12/2012 | Park et al. |
| 2012/0315605 A1 | 12/2012 | Cho |
| 2013/0035582 A1 | 2/2013 | Radulescu |
| 2013/0100008 A1 | 4/2013 | Marti |
| 2013/0101141 A1 | 4/2013 | McElveen |
| 2014/0168091 A1 | 6/2014 | Jones |
| 2014/0265572 A1 | 9/2014 | Siedenburg |
| 2015/0006645 A1 | 1/2015 | Oh |
| 2015/0007025 A1 | 1/2015 | Sassi |
| 2015/0066445 A1 | 3/2015 | Lin et al. |
| 2015/0070147 A1 | 3/2015 | Cruz-Hernandez et al. |
| 2015/0070245 A1 | 3/2015 | Han et al. |
| 2015/0110310 A1 | 4/2015 | Minnaar |
| 2015/0013023 A1 | 5/2015 | Harris et al. |
| 2015/0130323 A1 | 5/2015 | Harris |
| 2015/0192995 A1 | 7/2015 | Subramanian et al. |
| 2015/0220199 A1 | 8/2015 | Wang |
| 2015/0226831 A1 | 8/2015 | Nakamura et al. |
| 2015/0248787 A1 | 9/2015 | Abovitz |
| 2015/0277610 A1 | 10/2015 | Kim |
| 2015/0304789 A1 | 10/2015 | Babyoff |
| 2016/0044417 A1 | 2/2016 | Clemen |
| 2016/0124080 A1 | 5/2016 | Carter |
| 2016/0189702 A1 | 6/2016 | Blanc et al. |
| 2016/0246374 A1 | 8/2016 | Carter |
| 2016/0249150 A1 | 8/2016 | Carter et al. |
| 2016/0320843 A1 | 11/2016 | Long |
| 2017/0004819 A1 | 1/2017 | Ochiai |
| 2017/0018171 A1 | 1/2017 | Carter |
| 2017/0123499 A1 | 5/2017 | Eid |
| 2017/0193768 A1 | 7/2017 | Long |
| 2017/0193823 A1 | 7/2017 | Jiang |

FOREIGN PATENT DOCUMENTS

| | | |
|---|---|---|
| EP | 1911530 A1 | 4/2008 |
| GB | 2464117 | 4/2010 |
| GB | 2513884 | 11/2014 |
| GB | 2530036 | 3/2016 |
| JP | 2010109579 | 5/2010 |
| JP | 2011172074 | 9/2011 |
| JP | 201248378 | 3/2012 |
| KR | 20120065779 | 6/2012 |
| KR | 20130055972 | 5/2013 |
| KR | 20160008280 | 1/2016 |
| WO | 1991/18486 | 11/1991 |
| WO | 96/39754 | 12/1996 |
| WO | 2005/017965 | 2/2005 |
| WO | 2013/179179 | 12/2013 |
| WO | 2014181084 | 11/2014 |
| WO | 2015/039622 | 3/2015 |
| WO | 2016007920 | 1/2016 |
| WO | 2016132141 A1 | 8/2016 |
| WO | 2016132144 | 8/2016 |
| WO | 2016132144 A1 | 8/2016 |
| WO | 2016/162058 | 10/2016 |

OTHER PUBLICATIONS

Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Search report for PCT/US2018/028966 dated Jul. 13, 2018 (43 pages).
Search report for PCT/GB2018/051061 dated Sep. 26, 2018 (17 pages).
EPO Office Action for EP16708440.9 dated Sep. 12, 2018 (7 pages).
Pompei, F.J. (2002), "Sound from Ultrasound: The Parametric Array as an Audible Sound Source", Massachusetts Institute of Technology.
Hasegawa, K. and Shinoda, H. (2013) "Aerial Display of Vibrotactile Sensation with High Spatial-Temporal Resolution using Large Aperture Airbourne Ultrasound Phased Array", University of Tokyo.
Hoshi, T. et al. (2010), "Noncontrast Tactile Display Based on Radiation Pressure of Airbourne Ultrasound", IEEE Transactions on Haptics, vol. 3, No. 3.
Yoshino, K. and Shinoda, H. (2013), "Visio Acoustic Screen for Contactless Touch Interface with Tactile Sensation", University of Tokyo.
Tamakura, T. and Aoki, K. (2006) "A Highly Directional Audio System using a Parametric Array in Air" WESPAC IX 2006.
Alexander, J. et al. (2011), "Adding Haptic Feedback to Mobile TV".
Carter, T. et al. (2013) "Ultrahaptics: Multi-point Mid-Air Haptic Feedback for Touch Surfaces" UIST.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Search Report for GB1308274.8 dated Nov. 11, 2013.
Search Report for PCT/GB2014/051319 dated Jul. 28, 2014.
Gavrilov L R Et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
E.S. Ebbini et al. (1991), A spherical-section ultrasound phased array applicator for deep localized hyperthermia, Biomedical Engineering, IEEE Transactions on (vol. 38 Issue: 7), pp. 634-643.

(56) References Cited

OTHER PUBLICATIONS

Iwamoto et al. (2006), Two-dimensional Scanning Tactile Display using Ultrasonic Radiation Pressure, Symposium of Haptic Interfaces for Virtual Environment and Teleoperator Systems, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015.
IPRP for PCT/GB2014/051319 dated Nov. 10, 2015.
Search Report for GB1415923.0 dated Mar. 11, 2015.
Marshall, M., Carter, T., Alexander, J., & Subramanian, S. (2012). Ultratangibles: creating movable tangible objects on interactive tables. In Proceedings of the 2012 ACM annual conference on Human Factors in Computing Systems. (pp. 2185-2188).
Obrist et al., Talking about Tactile Experiences, CHI 2013, Apr. 27-May 2, 2013.
Long et al. Rendering Volumetric Haptic Shapes in Mid-Air using Ultrasound, ACM Transactions on Graphics (Proceedings of SIGGRAPH Asia), vol. 33, No. 6, Article 181.
Freeman et al., Tactile Feedback for Above-Device Gesture Interfaces: Adding Touch to Touchless Interactions ICMI'14, Nov. 12-16, 2014, Istanbul, Turkey.
Obrist et al., Emotions Mediated Through Mid-Air Haptics, CHI 2015, Apr. 18-23, 2015, Seoul, Republic of Korea.
Wilson et al., Perception of Ultrasonic Haptic Feedback on the Hand: Localisation and Apparent Motion, CHI 2014, Apr. 26-May 1, 2014, Toronto, Ontario, Canada.
Phys.org, Touchable Hologram Becomes Reality, Aug. 6, 2009, by Lisa Zyga.
Iwamoto et al., Airborne Ultrasound Tactile Display: Supplement, The University of Tokyo 2008.
Hoshi, T., Development of Aerial-Input and Aerial-Tactile-Feedback System, IEEE World Haptics Conference 2011, p. 569-573.
EPSRC Grant summary EP/J004448/1 (2011).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Eurohaptics Conference and Symposium on Haptic Interfaces for Virtual Environment and Teleoperator Systems 2009.
Tom Nelligan and Dan Kass, Intro to Ultrasonic Phased Array.
Light, E.D., Progress in Two Dimensional Arrays for Real Time Volumetric Imaging, 1998.
Casper et al., Realtime Control of Multiple-focus Phased Array Heating Patterns Based on Noninvasive Ultrasound Thermography, IEEE Trans Biomed Eng. Jan. 2012 ; 59(1): 95-105.
Hoshi, T., Touchable Holography, SIGGRAPH 2009, New Orleans, Louisiana, Aug. 3-7, 2009.
Sylvia Gebhardt, Ultrasonic Transducer Arrays for Particle Manipulation.
Marshall et al., Ultra-Tangibles: Creating Movable Tangible Objects on Interactive Tables, CHI'12, May 5-10, 2012, Austin, Texas.
Marzo et al., Holographic acoustic elements for manipulation of levitated objects, Nature Communications DOI: 10.1038/ncomms9661 (2015).
Search report and Written Opinion of ISA for PCT/GB2015/050417 dated Jul. 8, 2016.
Search report and Written Opinion of ISA for PCT/GB2015/050421 dated Jul. 8, 2016.
Martinez-Graullera et al., 2D array design based on Fermat spiral for ultrasonic imaging, Ultrasonics 50 (2010) 280-89.
Search report and Written Opinion of ISA for PCT/GB2017/050012 dated Jun. 8, 2017.
Search Report for PCT/GB2017/052332 dated Oct. 10, 2017.
A. Sand, Head-Mounted Display with Mid-Air Tactile Feedback, Proceedings of the 21st ACM Symposium on Virtual Reality Software and Technology, Nov. 13-15, 2015.

M. Toda, New Type of Matching Layer for Air-Coupled Ultrasonic Transducers, IEEE Transactions on Ultrasonics, Ferroelectrics, and Frequency Control, vol. 49, No. 7, Jul. 2002.
E. Bok, Metasurface for Water-to-Air Sound Transmission, Physical Review Letters 120, 044302 (2018).
Search Report for PCT/GB/2017/053880 dated Mar. 21, 2018.
Search Report for PCT/GB/2017/053729 dated Mar. 15, 2018.
M. A.B. Andrade, Matrix method for acoustic levitation simulation, IEEE Transactions on Ultrasonics Ferroelectrics and Frequency Control, 58 n. 8 (2011).
M. Barmatz, Acoustic radiation potential on a sphere in plane, cylindrical, and spherical standing wave of fields, J. Acoustical Socirty, 77 No. 3 (1985).
Yang Ling, Phase-coded approach for controllable generation of acoustical vortices, J. Applied Physics 113, No. 15 (2013).
K. Jia, Dynamic properties of micro-particles in ultrasonic transportation using phase-controlled standing waves, J. Applied Physics 116, n. 16 (2014).
Xin Cheng et al., Computation of the Acoustic Radiation Force on a Sphere Based on the 3-D FDTD Method, IEEE Symposium 2010.
Notice of Allowance dated Dec. 19, 2018 for U.S. Appl. No. 15/665,629 (pp. 1-9).
Notice of Allowance dated Dec. 21, 2013 for U.S. Appl. No. 15/983,864 (pp. 1-7).
Ex Parte Quayle Action dated Dec. 28, 2018 for U.S. Appl. No. 15/966,213 (pp. 1-7).
International Preliminary Report on Patentability and Written Opinion issued in corresponding PCT/US2017/035009, dated Dec. 4, 2018, 8 pages.
Office Action dated Feb. 20, 2019 for U.S. Appl. No. 15/623,516 (pp. 1-8).
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Goklurk, et al., "A Time-of-Flight Depth Sensor-System Description, Issues and Solutions," Published in: 2004 Conference on Computer Vision arid Pattern Recognition Workshop, Date of Conference: Jun. 27-Jul. 2, 2004, 9 pages.
Li, Larry, "Time-of-Flight Camera—An Introduction," Texas Instruments, Technical White Paper, SLOA190B—Jan. 2014 Revised May 2014, 10 pages.
Teixeira, et al., "A brief introduction to Microsoft's Kinect Sensor," Kinect, 26 pages., retrieved Nov. 2018.
Zeng, Wejun, "Microsoft Kinect Sensor and Its Effect," IEEE Multimedia, Apr.-Jun. 2012, 7 pages.
Kolb, et al., "Time-of-Flight Cameras in Computer Graphics," Computer Graphics forum, vol. 29 (2010), No. 1, pp. 141-159.
Iddan, et al., "3D Imaging in the Studio (and Elsewhwere . . . " Apr. 2001, 3DV systems Ltd., Yokneam, Isreal, www.3dvsystems.com.il, 9 pages.
Krim, et al., "Two Decades of Array Signal Processing Research—The Parametric Approach", IEEE Signal Processing Magazine, Jul. 1996, pp. 67-94.
Schmidt, Ralph, "Multiple Emitter Location and Signal Parameter Estimation" IEEE Transactions of Antenna and Propagation, vol. AP-34, No. 3, Mar. 1986, pp. 276-260.
Meijster, A., et al., "A General Algorithm for Computing Distance Transforms in Linear Time," Mathematical Morphology and its Applications to Image and Signal Processing, 2002, pp. 331-340.
Colgan, A., "How Does the Leap Motion Controller Work?" Leap Motion, Aug. 9, 2014, 10 pages.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to Wikipedia, 2 pages., Retrieved Nov. 2018.
"Welcome to Project Soli" video, https://atap.google.com/#project-soli Accessed Nov. 30, 2018, 2 pages.
Sixth Sense webpage, http://www.pranavmistry.com/projects/sixthsense/ Accessed Nov. 30, 2018, 7 pages.

(56) References Cited

OTHER PUBLICATIONS

Damn Geeky, "Virtual projection keyboard technology with haptic feedback on palm of your hand," May 30, 2013, 4 pages.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
PCT Partial International Search Report for Application No. PCT/GB2018/053404 dated Feb. 25, 2019, 13 pages.
International Search Report and Written Opinion for Application No. PCT/GB2018/053739, dated Jun. 4, 2019, 16 pages.
Corrected Notice of Allowability dated Jun. 21, 2019 for U.S. Appl. No. 15/966,213 (2 pages).
Office Action dated Jul. 10, 2019 for U.S. Appl. No. 15/210,661 (pp. 1-12).
Notice of Allowance dated Jul. 31, 2019 for U.S. Appl. No. 15/851,214 (pp. 1-9).
Office Action dated Jul. 26, 2019 for U.S. Appl. No. 16/159,695 (pp. 1-8).

TRANSDUCER DRIVER

RELATED APPLICATION

This application claims the benefit of the following U.S. Provisional patent application, which is incorporated by reference in its entirety:

1) Ser. No. 62/433,785, filed on Dec. 23, 2016.

FIELD OF THE DISCLOSURE

The present disclosure relates generally to improved driving techniques for acoustic transducers in mid-air haptic-based systems.

BACKGROUND

A continuous distribution of sound energy, referred to as an "acoustic field", may be used for a range of applications including parametric audio and the levitation of objects.

By defining one or more control points in space, the acoustic field can be controlled. Each point may be assigned a value equating to a desired amplitude at the control point. An acoustic field exhibiting the desired amplitude at the control points is created by actuating the set of transducers as a phased array. Focusing the energy in the desired control point location implies the transducers are excited at different times such that the waves output from each arrive together.

Specifically, mid-air haptic feedback is generated with array(s) of ultrasonic transducers. Typical arrays contain 256 (or more) transducers, all driven independently, to generate 'focal points' through constructive and destructive interference of the audio output from each transducer. To simplify implementation of the signal processing used to stimulate the ultrasonic transducers the fixed frequency digital inputs (often 40 kHz) are typically divided into a fixed number of phases, with each transducer switching synchronously on a phase transition.

Ultrasonic transducers are typically driven with a digital electrical input signal, generating an analog audio output signal. The digital signal is typically originally generated at 3V (or less) by digital signal processing circuits but the ultrasonic transducer must be driven with a higher voltage, typically 20V, to maximize the audio power emitted by the transducer. When the digital control signal switches to 3V the transducer will be driven to 20V. When the digital control signal switches to 0V the transducer will also be driven to 0V. The ultrasonic transducers are typically driven at a fixed frequency (often 40 kHz) corresponding to the resonant frequency of the transducer.

Existing driver circuits can provide direct voltage drive to the transducer, driving the capacitive load to the 20V output voltage through a small (ideally zero) output impedance. Alternatively they can provide current drive, driving the capacitive load to the 20V output voltage by sourcing a significant (typically 100's of mA) current.

The digital control signal is typically 'level shifted' from the 3V low voltage to the 20V high voltage with the use of a level shifting circuit. Since the transducer has a significant capacitance, typically 2 nF (or more) then the level shifting circuit must be capable of sourcing (sinking) a significant current for a very short time when the transducer switches between 0V and 20V.

Typical peak switching current for a single transducer with input capacitance of 2 nF switching between 0V and 20V in 100 ns would be given by $$i = C\frac{dV}{dt} = 2 \text{ nF} * \frac{20 \text{ V}}{100 \text{ ns}} = 2 * \frac{1}{5} = 0.4 \text{ A} = 400 \text{ mA}$$

Local 'decoupling' capacitance is typically used to reduce the demand for current from a power supply during this switching, often reducing the peak current to about 200 mA over 200 ns.

With an array of (typically) 256 transducers it will be common for several transducers to switch (between 0V and 20V) at the same time. For example, if 8 transducers switch simultaneously then the peak current required from the power supply would be 8*400 mA or 3.2 A without local decoupling capacitance and 1.6 A with local decoupling capacitance, corresponding to eight driver circuits each requiring peak current of 400 mA.

The peak current in this example would last for 200 ns but if the 40 kHz digital input frequency was divided in (say) 64 phases then each phase would last for 390 ns and the power supply would need to source an average of approximately 0.5 A, with the peak being 1.6 A.

Switching the load on a power supply between 0 A and >1 A every 200 ns can cause major variation on the output voltage of the power supply based on the load transient response. Depending on the power supply characteristics this could cause more than 10% variation (for example) in the nominal 20V output voltage so that actual power supply output voltage is somewhere between 18V and 22V, leading to both an uncontrolled reduction and increase in output audio power and cross modulation between transducers impacting the control point(s).

The example described above requires an average of 0.5 A with a peak of 1.6 A for 8 transducers switching at the same time. If 16 or 32 transducers were to switch at the same time the average (peak) current would become 1 A (3.2 A) and 2 A (6.4 A) respectively.

Typical power supplies have a peak output current they can support. Whatever the peak output current for the power supply, with an array of ultrasonic transducers driven as described there will be an upper limit on the number of transducers that may switch at the same time.

Accordingly, there is a need for an improved transducer circuit that can address the foregoing limitations and drive the transducers in a more efficient manner.

SUMMARY OF THE INVENTION

By adding local decoupling capacitance combined with a method of constant current charging of the local decoupling capacitance, the PWM switching of the transducer can be isolated from the accumulation of the energy needed to switch the transducer minimizing the average current drawn from the power supply and significantly reducing the peak current requirements for the power supply. Additionally the charge required to switch the transducer can be locally reused to further reduce the average current drawn from the power supply.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 shows a partial integrated circuit-based solution for a driver for a single transducer.

Figure 1:
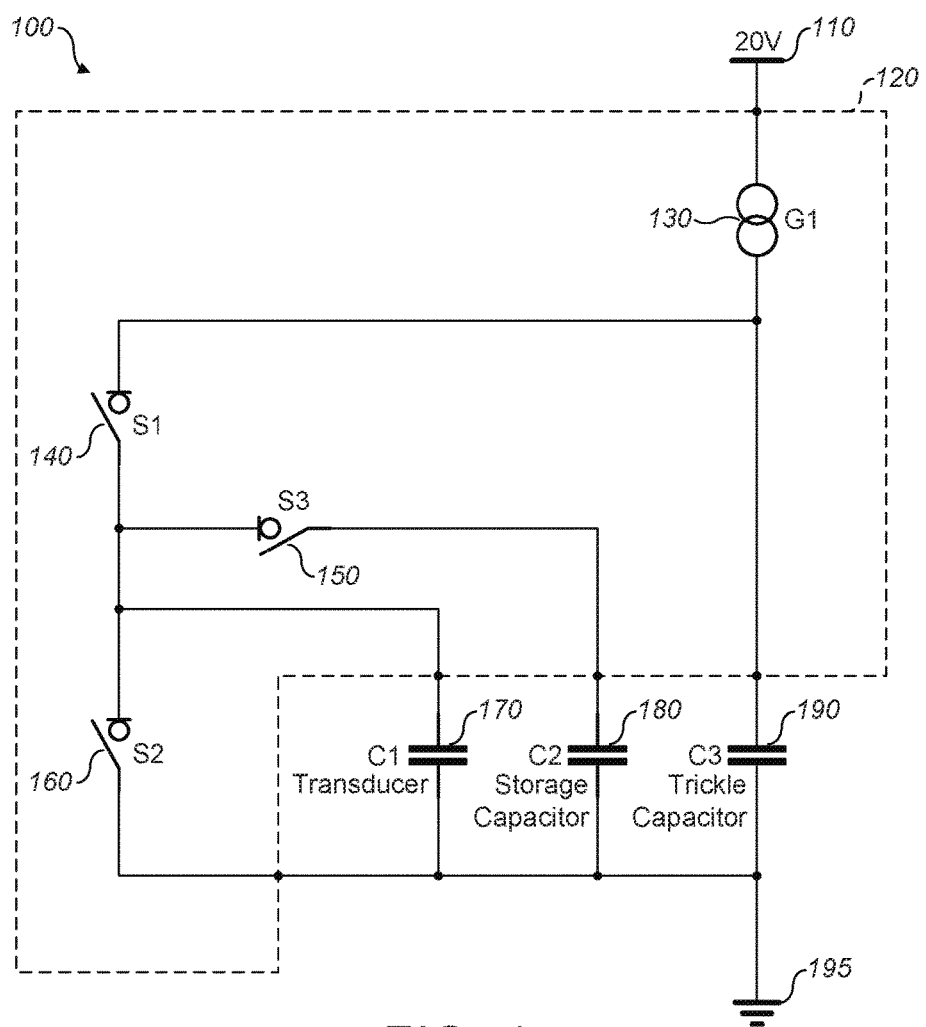

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Problems to be Addressed

A solution for an improved transducer driver should be designed to address at least the following problems.

Problem 1: Peak Current Required from the Power Supply is Excessive.

For representative array of 256 transducers described above this will be greater than 1 A.

Problem 2: Power Supply Current Varies with Number of Simultaneously Switching Transducers.

For the representative array of 256 transducers described above the required current can reach 4 A and realistically exceeds the peak output current of any practical consumer power supply and introduces distortion into the audio output, impacting the implementation of the control point.

Problem 3: Direct Drive of Transducers from the High Voltage Power Supply

Any driver circuit which connects the transducer directly to the 20V high voltage power supply has an inherent failing that there can be no power supply rejection and the power supply load transient response will drive—not couple, drive—directly into all transducers, introducing crosstalk between transducer outputs.

Problem 4: Unwanted Modulation of the Transducer Outputs

Since existing solutions switch large currents (problem 1) with the instantaneous current significantly varying based on numbers of switching transducers (problem 2) then the direct driving of transducers from the power supply (problem 3) creates an additional problem—the load transient response of the power supply directly modulates all active transducers in the array, further degrading the implementation of the control point.

Problem 5: Discharging Transducer (Charge) into Ground is Inefficient.

Charge removed from the transducer when switching from 20V to 0V is discarded by existing solutions by transferring it to ground, which makes existing approaches inefficient.

II. Introduction to the Solution

The circuit requirement is for the transducer to be driven to 20V by charging its 2 nF input capacitance. The prior solution acts to transfer the charge required to switch the transducer (to 20V) from the power supply over the same time the transducer is switching, leading to huge peak currents for very short periods of time, with no current required for the majority of the 40 kHz cycle.

Additionally, during the period that the transducer is held at 20V this is achieved with a direct connection between the 20V power rail and the transducer. Any variation on the 20V power rail directly drives (not couples, drives) onto the transducer, modulating the audio output.

If local "decoupling" capacitance is included with the level shifter circuit then part of the charge required for switching is sourced from the decoupling capacitance. Thus when switching completes, additional charge is transferred immediately from the power supply back into the decoupling capacitance. This acts to lower the peak current but extends the time current is required.

The prior solution does not utilize the full period of the 40 kHz digital switching signal. If the 40 kHz switching signal is divided into 64 equal phases, each phase corresponds to 390 ns. The period of a 40 kHz frequency is 25,000 ns. Assuming the switching time for a transducer is 100 ns then every 25,000 ns the transducer will switch once from 0V to 20V and from 20V to 0V.

The transition from 0V to 20V deposits charge from the power supply onto the transducer. The transition from 20V to 0V removes charge from the transducer into ground.

In this representative example only 0.4% (100 ns in 25,000 ns) of the 40 kHz digital switching waveform corresponds to transfer of charge onto the transducer to drive its voltage to 20V. The remaining 99.6% of the 40 kHz switching waveform is unused for transfer of charge from the power supply with the existing approach. The 99.6% of unused time could be used for the transfer of charge from the power supply into a local storage capacitor. When charge is required to switch the transducer from 0V to 20V it can be supplied from this local storage capacitor.

The present invention solves problem 1 by fully utilizing 100% of the 40 kHz switching waveform for uniform transfer of charge from the power supply to capacitance local to the transducer.

By using 100% of the 40 kHz cycle for transfer of charge from the power supply the peak current required from the power supply can be reduced by a factor of 1/0.004=250 (from 0.4%) so the current per transducer decreases from a peak of 400 mA centered at the PWM switching instant to a constant 400 mA/250=1.6 mA spread across the entire 40 kHz cycle.

The solution relies on 'trickle charging' a local storage capacitor and using this local charge to switch the transducer to 20V such that the power supply loading remains (almost) constant throughout the 40 kHz cycle. This approach enables any number of transducers, unrestricted by power supply performance, to switch simultaneously, since the load on the power supply is almost constant.

Since the charge required to switch each transducer (to 20V) is accumulated over the full 40 kHz cycle then the two actions of collecting the charge needed for switching and the actual switching are separated, meaning that the current drawn from the power supply becomes independent to the number of transducers switching. The present invention thus removes the practical limit on the number of concurrently switching transducers.

The concept described herein does not drive the transducer directly from the power supply, rather the power supply is used to accumulate charge on a local capacitor which is then used to charge the transducer to switch from 0V to 20V. Addition of some form of voltage detection and limiting to the transducer relaxes the requirement for an accurate stable power supply. So long as the local storage capacitor accumulates sufficient charge during the 40 kHz cycle the transducer will charge to the required controlled 20V voltage. The additional limiting function can be achieved in many different ways but one possible approach for a discrete PCB implementation would be the use of a 20V Zener diode connected in parallel to the transducer.

The concepts described below reduce the current draw requirements of a 256 transducer array from several A to a few hundred mA. To reduce current drain further requires that charge used to switch the transducer to 20V is removed from the transducer, but critically not discarded, when switching to 0V. When switching the transducer back to 20V this local retained charge can be deposited back on the transducer to switch the transducer partially towards the 20V voltage. This directly reduces the charge which must be transferred from the main (local) storage capacitor. In this way, the main capacitor requires less charge in each 40 kHz cycle to return to the fully charged condition.

III. Trickle Charging

Typical ultrasonic transducers act as a 2.5 nF capacitive load (on the driver circuit) and must be driven with 15-20V, with the transducer voltage switching between 0V and 20V in typically 100 ns.

Existing solutions switch transducers between 0V and 20V driving directly from the power supply.

Switching 2 nF within 100 ns to 20V requires an average current (into the transducer) of 400 mA.

$$i = C\frac{dV}{dt} = 2 \text{ nF} * \frac{20 \text{ V}}{100 \text{ ns}} = 2 * \frac{1}{5} = 0.4 \text{ A} = 400 \text{ mA}$$

For a typical implementation using an array of 256 transducers where 10% switch synchronously the peak current required from the power supply would be approximately 256*10/100*400 mA=10.2 A for 100 ns then return to 0 A, the effective load per transducer varying abruptly between (approx.) 40Ω and open circuit.

For a situation where transducers are switched at their resonant frequency (typically 40 kHz) with a 64 phase PWM waveform then the power supply is presented with this load at a 2.56 MHz rate since switching instants occur every 390 ns.

Reducing peak current per transducer (in a 64 phase solution) by increasing switching time by 3.9× degrades ultrasonic performance but still requires a power supply capable of delivering 2.6 A.

If the number of switching phases within the 40 kHz PWM cycle increases then the required switching time to switch each transducer from 0V to 20V decreases and the peak current drawn from the power supply increases.

This approach transfers charge from the power supply for (approx.) 100 ns every 25,000 ns and charge transfer only makes effective use of 4% of the 40 kHz switching period.

Addition of a local capacitor per transducer enables a more efficient use of the 40 kHz switching period. By trickle charging this local capacitor throughout the full 40 kHz cycle, the effective load on the power supply (per transducer) is translated into an almost constant (approx.) 10 kΩ, load.

When the transducer switches from 0V to 20V charge is transferred onto the transducer capacitance from the local storage capacitor rather than directly from the power supply.

An array of 256 transducers operating with the trickle charging technique requires an almost constant current of 384 mA and can support all transducers simultaneously switching, providing an improvement of $$\frac{2.5 \text{ nF} * \frac{20 \text{ V}}{100 \text{ ns}} * \frac{10}{100}}{0.384 \text{ A}}$$

or 33× over existing approaches for an array of 256 transducers with 256 phases with 10% coincident switching.

With a typical 20V power supply capable of sourcing 5 A, the existing technique for switching transducers would be unable to switch more than 10 transducers switching simultaneously. Trickle charging local storage capacitance reduces peak current draw from >10,000 mA to 384 mA, a performance improvement of 26×.

IV. Voltage Clamping at Transducer

Typical ultrasonic transducers have an input capacitance of approximately 2 nF but with a typical tolerance of ±20%.

Existing solutions drive each transducer directly from a common power supply. Often this power supply is 20V, driving transducers to the maximum rated voltage. By driving all transducers directly from the power supply the output voltage for all transducers (after initial switching completes) will be identical and match power supply voltage (often 20V).

Adopting an indirect charging approach results in the transducer being current driven rather than voltage driven. The output voltage on each transducer when current driven depends on the specific capacitance of each individual transducer. Additionally, when charge sharing is used to drive the transducer voltage the specific value of the local charge storage capacitor affects the transducer voltage.

Monitoring the output voltage for each transducer and stopping current drive/charge sharing when the transducer voltage reaches a fixed voltage (common for all transducers in the array) acts to eliminate variations in transducer voltage caused by variations in either the transducer capacitance or variations in the local charge storage capacitance.

V. Charge Recirculation onto/from Transducer

The existing approach for directly driving ultrasonic transducers, described above, sources charge from VDD (or voltage source) to drive the transducer to 20V and discharges the transducer into VSS (or ground or voltage sink) to drive the output to 0V, generating a PWM output waveform. This sequence is repeated at the resonant frequency of the transducer, often 40 kHz.

Charge pumped onto the transducer every 40 kHz cycle is also discarded during each 40 kHz cycle.

Transfer of charge away from the transducer onto a local storage capacitor when the transducer must switch from 20V to 0V and subsequent transfer of the locally stored charge back onto the transducer when switching the transducer from 0V to 20V would minimize the amount of charge discarded during each 40 kHz cycle.

One possible implementation of this technique would add one capacitor and one switch to the transducer driver circuit. The switch could be used to transfer charge away from the transducer onto the local storage capacitor during the transition 20V to 0V. The switch can also be used to transfer charge back onto the transducer during the transition from 0V to 20V. In such an implementation the amount of charge transferred will depend on the capacitance ratio between the transducer and the local storage capacitor. Any excess charge remaining during the 20V to 0V transition would still be discharged to VSS (or ground or voltage sink). Any additional charge required during the 0V to 20V transition would still be sourced from VDD (or voltage source).

This technique can offer 50% efficiency improvements to the current consumption of the transducer driver circuit described above

VI. Amplitude Modulation of Transducer Output

By limiting the transfer of charge from the trickle and storage capacitors into the transducer, the amplitude of the two state, digital electrical input voltage applied to the transducer can be controlled resulting in control of the amplitude of the analog audio output signal from the transducer.

Controlling the voltage used to drive the transducer reduces the charge required to drive the transducer to the target voltage, which lowers the average current drawn from the power supply to operate each transducer. In this way the power consumption of the transducer array can be further reduced.

VII. Figure Descriptions

Turning to FIG. 1, shown is a partial integrated circuit-based solution for a driver for a single transducer 100. The integrated circuit components are located within the dashed border 120; discrete components are located outside the dashed border 120. The integrated circuit is connected to a 20V (or other voltage) power supply 110 and to ground 195 that is intended to provide the necessary voltage for the transducer 170. Within the integrated circuit, a current source G1 130 drives current to constantly charge the trickle capacitor C3 190. A first switch S1 140 is installed between the current source 130 and two connections, one to the transducer C1 170 and one to the storage capacitor C2 180. A second switch S2 160 is installed between first switch S1 140 and in parallel with a transducer C1 170. A third switch S3 150 is installed between the first switch S1 140 and a storage capacitor C2 180.

Switch S1 140 is used to charge the transducer from 0V to 20V. When switch S1 140 is closed charge accumulated on the capacitor C3 190 is transferred onto the transducer C1 170. Current from the current source G1 130 is also provided to both capacitor C3 190 and transducer C1 170. Flow of charge between capacitor C3 190 and transducer C1 170 will cease when the same voltage is developed across both components. Switch S1 140 will only close when the transducer C1 170 is at 0V when driven to create haptic feedback.

When switch S1 140 is open the current from the current source G1 130 flows into the capacitor C3 190, charging the capacitor towards 20V. As the voltage across capacitor C1 170 approaches 20V the current source G1 130 will begin to collapse.

Switch S2 160 is used to discharge the transducer C1 170 from 20V to 0V. When switch S2 160 is closed the charge on the transducer C1 170 is discharged into VSS or ground 195.

When switch S2 160 is open the transducer C1 170 is prevented from discharging into VSS or ground 195.

When switch S3 150 is closed the local storage capacitor C2 180 is connected into the circuit. Switch S3 150 is only closed when both switch S1 190 and switch S2 160 are open.

When switch S3 150 is closed and the transducer C1 170 voltage is 20V then the charge stored on the transducer C1 170 is transferred to local storage capacitor C2 180. Flow of charge between transducer C1 170 and local storage capacitor C2 180 will cease when the same voltage is developed across both components.

When switch S3 150 is closed and the transducer C1 170 voltage is 0V then the charge stored on the local storage capacitor C2 180 is transferred to transducer C1 170. Flow of charge between transducer C1 170 and local storage capacitor C2 180 will cease when the same voltage is developed across both components.

When discharging the transducer C1 170 into the local storage capacitor C2 180 there will be a residual charge retained on the transducer C1 170 requiring switch S3 150 to be opened and switch S2 160 to be closed to fully discharge transducer C1 170 to 0V.

When charging the transducer C1 170 from the local storage capacitor C2 180 the voltage on transducer C1 170 may not reach 20V depending on the available charge on local storage capacitor C2 180. Switch S3 150 will be opened and switch S1 140 closed to transfer the required charge from capacitor C3 190 to charge transducer C1 170 to 20V.

When switch S3 150 is open the local storage capacitor C2 180 is isolated to retain charge needed for subsequent charging of transducer C1 170 to 20V.

Capacitors C2 180 and C3 190 may typically be external components mounted on a printed circuit board but there is no functional reason they could not be integrated onto a silicon chip.

Capacitor C3 190 and current source G1 130 isolate switching of the transducer C1 170 from the 20V power supply 110. Switches S1 140, S2 150 and S3 160 are used for the rapid transfer of charge between transducer C1 170, local storage capacitor C2 180 and trickle capacitor C3 190. The on resistance of switches S1 140, S2 150 and S3 160 must be minimized towards a few Ohms to maintain efficiency of the switching activity as charge is moved between transducer C1 170, local storage capacitor C2 180 and trickle capacitor C3 190. Implementation of low on-resistance switches in integrated circuit form requires the use of very large transistors and switches S1 140, S2 150 and S3 160, which may constitute the majority of the silicon die area for the circuit shown in FIG. 1 100.

Figure 2:
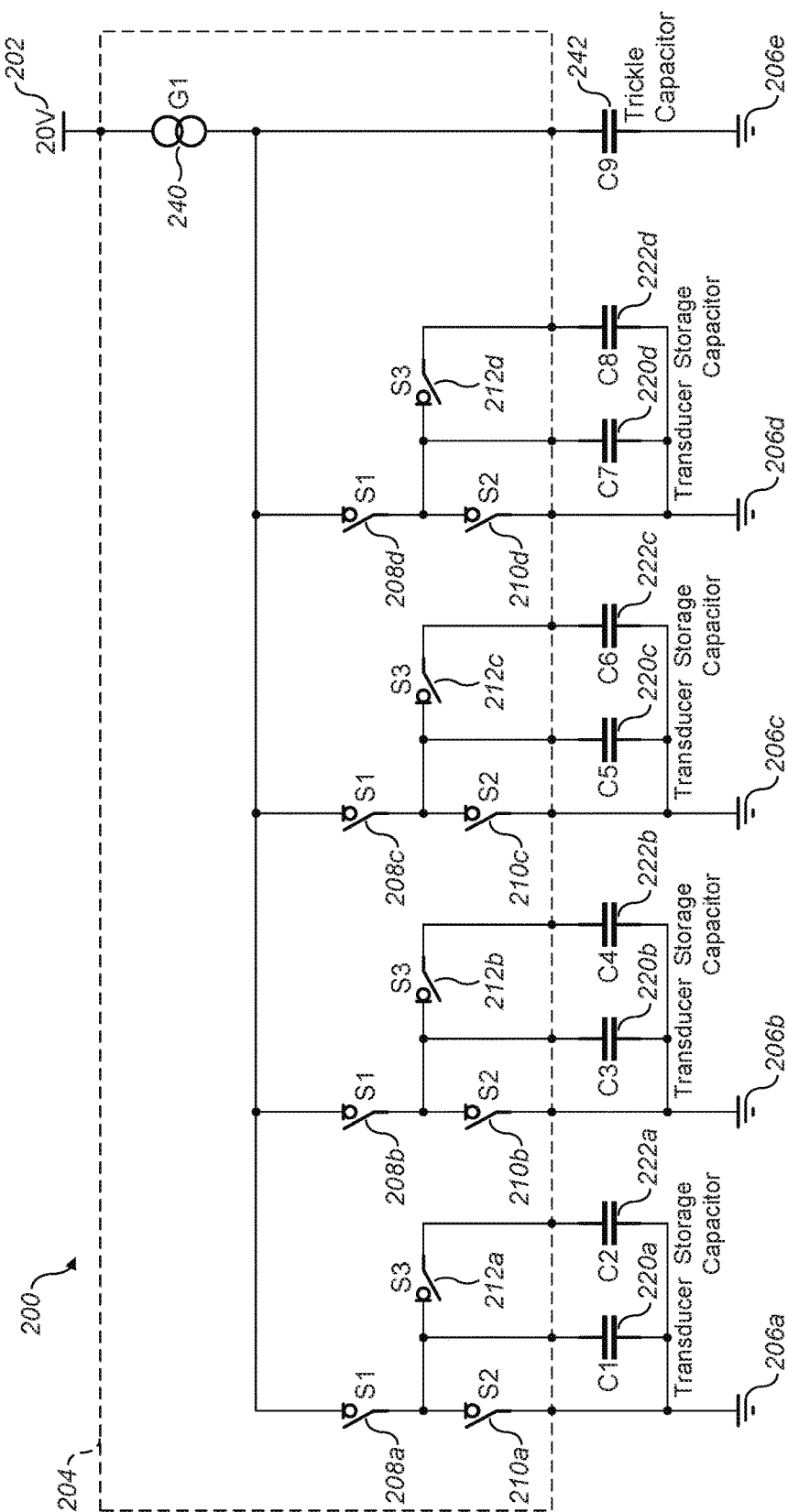
FIG. 2 shows a partial integrated circuit-based solution for a driver for multiple transducers.

Turning to FIG. 2, shown is a partial integrated circuit-based solution for a driver for multiple transducers 200. The integrated circuit components are located within the dashed border 204; discrete components are located outside the dashed border 204. The integrated circuit is connected to a 20V (or other voltage) power supply 202 and to ground 206a, 206b, 206c, 206d, 206e that is intended to provide the necessary voltage for the four shown transducers C3 220a, 220b, 220c, 220d. (Although 4 transducers are shown in FIG. 2, any two or more transducers may be arranged in the same way.) Within the integrated circuit, a current source G1 240 drives current to constantly charge the trickle capacitor C9 242.

Within the integrated circuit, a current source G1 130 drives current to constantly charge the trickle capacitor C3 190. A first switch S1 140 is installed between the current source 130 and two connections, one to the transducer C1 170 and one to the storage capacitor C2 180. A second switch S2 160 is installed between first switch S1 140 and in parallel with a transducer C1 170. A third switch S3 150 is installed between the first switch S1 140 and a storage capacitor C2 180.

Each transducer C1 220a, C3 220b, C5 220c, C7 220d is wired in parallel with a corresponding storage capacitor C2 222a, C4 222b, C6 222c, C8 222d.

For each transducer, a first switch S1 208a, 208b, 208c, 208d is installed between the current source 240 and two connections, one to the transducer C1 220a, C3 220b, C5 220c, C7 220d and one to the storage capacitor C2 222a, C4 222b, C6 222c, C8 222d. A second switch S2 210a, 210b, 210c, 201d is installed between first switch S1 208a, 208b, 208c, 208d and in parallel with a transducer C1 220a, C3 220b, C5 220c, C7 220d. A third switch S3 212a, 212b, 212c, 212d is installed between the first switch S1 208a, 208b, 208c, 208d and a storage capacitor storage capacitor C2 222a, C4 222b, C6 222c, C8 222d.

Switch S1 208a, 208b, 208c, 208d is used to charge the transducer from 0V to 20V. When switch S1 208a, 208b, 208c, 208d is closed charge accumulated on the capacitor C3 242 is transferred onto the transducer C1 220a, 220b, 220c, 220d. Current from the current source G1 240 is also provided to both capacitor C3 242 and transducer C1 220a, 220b, 220c, 220d. Flow of charge between capacitor C3 242 and transducer C1 220a, 220b, 220c, 220d will cease when the same voltage is developed across both components. Switch S1 208a, 208b, 208c, 208d would only close when the transducer C1 220a, 220b, 220c, 220d is at 0V when driven to create haptic feedback.

When switch S1 208a, 208b, 208c, 208d is open the current from the current source G1 240 flows into the capacitor C3 242, charging the capacitor towards 20V. As the voltage across capacitor C1 220a, 220b, 220c, 220d approaches 20V the current source G1 240 will begin to collapse.

Switch S2 210a, 210b, 210c, 210d is used to discharge the transducer C1 220a, 220b, 220c, 220d from 20V to 0V. When switch S2 210a, 210b, 210c, 210d is closed the charge on the transducer C1 220a, 220b, 220c, 220d is discharged into VSS or ground 206a, 206b, 206c, 206d.

When switch S2 210a, 210b, 210c, 210d is open the transducer C1 220a, 220b, 220c, 220d is prevented from discharging into VSS or ground 206a, 206b, 206c, 206d.

When switch S3 212a, 212b, 212c, 212d is closed the local storage capacitor C2 180 is connected into the circuit. Switch S3 212a, 212b, 212c, 212d is only closed when both switch S1 208a, 208b, 208c, 208d and switch S2 210a, 210b, 210c, 210d are open.

When switch S3 212a, 212b, 212c, 212d is closed and the transducer C1 220a, 220b, 220c, 220d voltage is 20V then the charge stored on the transducer C1 220a, 220b, 220c, 220d is transferred to local storage capacitor C2 180. Flow of charge between transducer C1 220a, 220b, 220c, 220d and local storage capacitor C2 222a, 222b, 222c, 222d will cease when the same voltage is developed across both components.

When switch S3 212a, 212b, 212c, 212d is closed and the transducer C1 220a, 220b, 220c, 220d voltage is 0V then the charge stored on the local storage capacitor C2 222a, 222b, 222c, 222d is transferred to transducer C1 220a, 220b, 220c, 220d. Flow of charge between transducer C1 220a, 220b, 220c, 220d and local storage capacitor C2 222a, 222b, 222c, 222d will cease when the same voltage is developed across both components.

When discharging the transducer C1 220a, 220b, 220c, 220d into the local storage capacitor C2 222a, 222b, 222c, 222d there will be a residual charge retained on the transducer C1 220a, 220b, 220c, 220d requiring switch S3 212a, 212b, 212c, 212d to be opened and switch S2 210a, 210b, 210c, 210d to be closed to fully discharge transducer C1 220a, 220b, 220c, 220d to 0V.

When charging the transducer C1 220a, 220b, 220c, 220d from the local storage capacitor C2 222a, 222b, 222c, 222d the voltage on transducer C1 220a, 220b, 220c, 220d may not reach 20V depending on the available charge on local storage capacitor C2 222a, 222b, 222c, 222d. Switch S3 212a, 212b, 212c, 212d will be opened and switch S1 208a, 208b, 208c, 208d closed to transfer the required charge from capacitor C3 242 to charge transducer C1 220a, 220b, 220c, 220d to 20V.

When switch S3 212a, 212b, 212c, 212d is open the local storage capacitor C2 222a, 222b, 222c, 222d is isolated to retain charge needed for subsequent charging of transducer C1 220a, 220b, 220c, 220d to 20V.

Capacitors C2 222a, 222b, 222c, 222d and C3 242 would typically be external components mounted on a printed circuit board but there is no functional reason they could not be integrated onto a silicon chip.

Capacitor C3 242 and current source G1 240 isolate switching of the transducer C1 220a, 220b, 220c, 220d from the 20V power supply 202. Switches S1 208a, 208b, 208c, 208d, S2 210a, 210b, 210c, 210d and S3 212a, 212b, 212c, 212d are used for the rapid transfer of charge between transducer C1 220a, 220b, 220c, 220d, local storage capacitor C2 222a, 222b, 222c, 222d and trickle capacitor C3 242. The on resistance of switches S1 208a, 208b, 208c, 208d, S2 210a, 210b, 210c, 210d and S3 212a, 212b, 212c, 212d must be minimized towards a few Ohms to maintain efficiency of the switching activity as charge is moved between transducer C1 220a, 220b, 220c, 220d, local storage capacitor C2 222a, 222b, 222c, 222d and trickle capacitor C3 242. Implementation of low on-resistance switches in integrated circuit form requires the use of very large transistors and switches S1 208a, 208b, 208c, 208d, S2 210a, 210b, 210c, 210d and S3 212a, 212b, 212c, 212d constitute the majority of the silicon die area for the circuit shown in FIG. 2 200.

The switches S1 208a, 208b, 208c, 208d, S2 210a, 210b, 210c, 210d and S3 212a, 212b, 212c, 212d in conjunction with local storage capacitor C2 222a, 222b, 222c, 222d comprise the driver circuit for transducer C1 220a, 220b, 220c, 220d. Trickle capacitor C3 242 and current source G1 240 could be replicated for each transducer driver circuit or could be a common resource shared between some or all of the driver circuits to optimize the number of external components on the printed circuit board.

Figure 3:
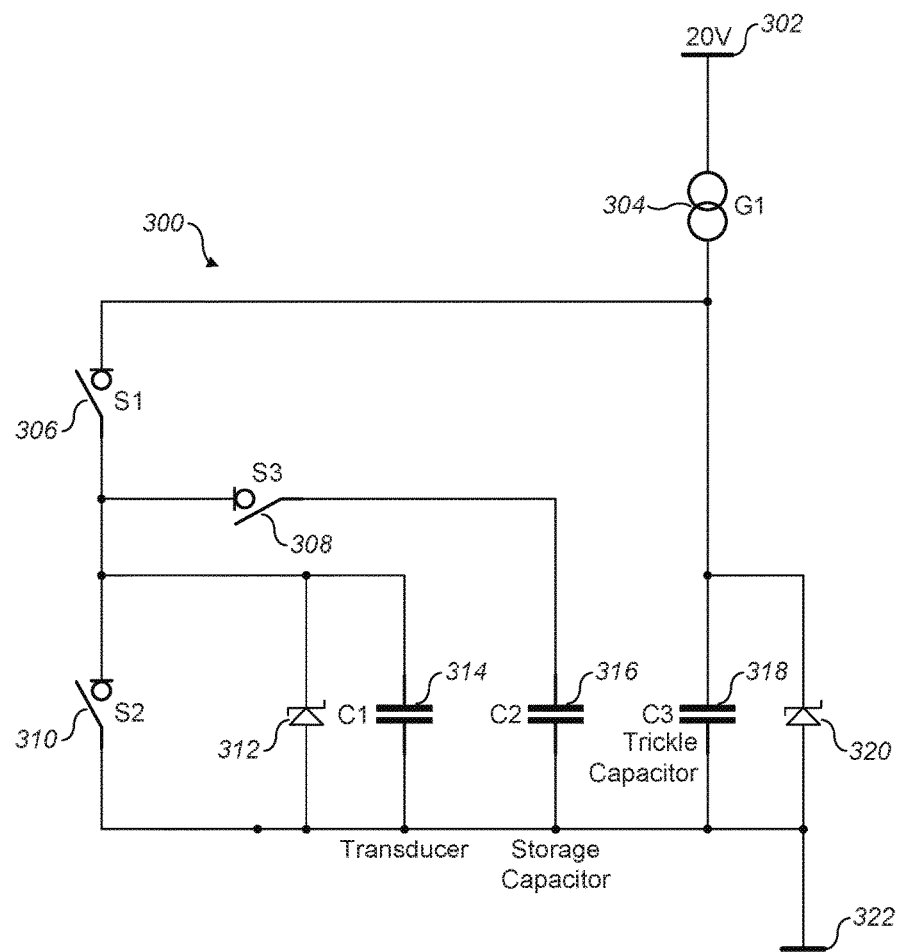
FIG. 3 shows a printed circuit board-based solution for a driver for a single transducer.

Turning to FIG. 3, shown is a printed circuit board-based solution for a driver for a single transducer 300. The circuit is connected to a 20V (or other voltage) power supply 302 and to ground 322 that is intended to provide the necessary voltage for the transducer C1 170. Within the circuit, a current source G1 304 drives current to constantly charge the trickle capacitor C3 318. In parallel with the trickle capacitor C3 318 is an optional Zener diode 320 used to limit the voltage applied to transducer C1 314. In parallel with the transducer C1 314 is an optional Zener diode 312 used to limit the voltage applied to capacitor C3 318. The Zener diodes 312 and 320 are optionally used to limit voltages created during circuit operation. In the integrated circuit implementation described in FIG. 1 and FIG. 2 the functionality of the optional Zener diodes can be performed with on-chip voltage detection circuits known to anyone of ordinary skill in the art.

Switch S1 306 is used to charge the transducer from 0V to 20V. When switch S1 306 is closed charge accumulated on the capacitor C3 318 is transferred onto the transducer C1 314. Current from the current source G1 304 is also provided to both capacitor C3 318 and transducer C1 314. Flow of charge between capacitor C3 318 and transducer C1 314 will cease when the same voltage is developed across both components. Switch S1 306 would only close when the transducer C1 314 is at 0V when driven to create haptic feedback.

When switch S1 306 is open the current from the current source G1 304 flows into the capacitor C3 318, charging the capacitor towards 20V. As the voltage across capacitor C1 314 approaches 20V the current source G1 304 will begin to collapse.

Switch S2 310 is used to discharge the transducer C1 314 from 20V to 0V. When switch S2 310 is closed the charge on the transducer C1 314 is discharged into VSS or ground 322.

When switch S2 310 is open the transducer C1 314 is prevented from discharging into VSS or ground 322.

When switch S3 308 is closed the local storage capacitor C2 316 is connected into the circuit. Switch S3 308 is only closed when both switch S1 306 and switch S2 310 are open.

When switch S3 308 is closed and the transducer C1 314 voltage is 20V then the charge stored on the transducer C1 314 is transferred to local storage capacitor C2 316. Flow of charge between transducer C1 314 and local storage capacitor C2 316 will cease when the same voltage is developed across both components.

When switch S3 308 is closed and the transducer C1 314 voltage is 0V then the charge stored on the local storage capacitor C2 316 is transferred to transducer C1 314. Flow of charge between transducer C1 314 and local storage capacitor C2 316 will cease when the same voltage is developed across both components.

When discharging the transducer C1 314 into the local storage capacitor C2 316 there will be a residual charge retained on the transducer C1 314 requiring switch S3 308 to be opened and switch S2 310 to be closed to fully discharge transducer C1 314 to 0V.

When charging the transducer C1 314 from the local storage capacitor C2 316 the voltage on transducer C1 314 may not reach 20V depending on the available charge on local storage capacitor C2 316. Switch S3 308 will be opened and switch S1 306 closed to transfer the required charge from capacitor C3 318 to charge transducer C1 314 to 20V.

When switch S3 308 is open the local storage capacitor C2 316 is isolated to retain charge needed for subsequent charging of transducer C1 314 to 20V.

Capacitor C3 318 and current source G1 304 isolate switching of the transducer C1 314 from the 20V power supply 302. Switches S1 306, S2 310 and S3 308 are used for the rapid transfer of charge between transducer C1 314, local storage capacitor C2 316 and trickle capacitor C3 318. The on resistance of switches S1 306, S2 310 and S3 308 must be minimized towards a few Ohms to maintain efficiency of the switching activity as charge is moved between transducer C1 314, local storage capacitor C2 316 and trickle capacitor C3 318. Implementation of low on-resistance switches in integrated circuit form requires the use of very large transistors and switches S1 306, S2 310 and S3 308 constitute the majority of the silicon die area for the circuit shown in FIG. 3 300.

VI. Conclusion

While the foregoing descriptions disclose specific values of voltage, capacitance and current, any other specific values may be used to achieve similar results. Further, the various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A circuit comprising:
a voltage source;
a voltage sink;
a current source having a current source first end and a current source second end;
a trickle capacitor having a trickle capacitor first end and a trickle capacitor second end;
a storage capacitor having a storage capacitor first end and a storage capacitor second end;
a haptic system transducer having a transducer first end and a transducer second end;

a first switch having a first switch first end and a first switch second end;
a second switch having a second switch first end and a second switch second end;
a third switch having a third switch first end and a third switch second end;
wherein the current source first end is connected to the voltage source;
wherein the current source second end is connected to the trickle capacitor first end and is connected to the first switch first end;
wherein the first switch second end is connected to the third switch first end and is connected to the second switch first end and is connected to the transducer first end;
wherein the third switch second end is connected to the storage capacitor first end; and
wherein the second switch second end, the transducer second end, the storage capacitor second end and the trickle capacitor second end are connected to the voltage sink.

2. The circuit as in claim 1 wherein the current source, the first switch, the second switch and the third switch are located on an integrated circuit.

3. The circuit as in claim 2, wherein the voltage source, the voltage sink, the transducer, the storage capacitor, and the trickle capacitor are discrete components.

4. The circuit as in claim 2, wherein the storage capacitor and the trickle capacitor are located on the integrated circuit.

5. The circuit as in claim 2, wherein when the first switch is closed, charge accumulated on the trickle capacitor is transferred onto the transducer.

6. The circuit as in claim 2, wherein when the first switch is open the current from the current source flows into the trickle capacitor charging the capacitor towards the amount of the voltage source.

7. The circuit as in claim 2, wherein when the second switch is closed the charge on the transducer is discharged into the voltage sink.

8. The circuit as in claim 2, wherein when the second switch is open the transducer is prevented from discharging into the voltage sink.

9. A circuit comprising:
a voltage source;
a voltage sink;
a current source having a current source first end and a current source second end;
a trickle capacitor having a trickle capacitor first end and a trickle capacitor second end;
a first storage capacitor having a first storage capacitor first end and a first storage capacitor second end;
a first haptic system transducer having a first transducer first end and a first transducer second end;
a first switch having a first switch first end and a first switch second end;
a second switch having a second switch first end and a second switch second end;
a third switch having a third switch first end and a third switch second end;
a second storage capacitor having a second storage capacitor first end and a second storage capacitor second end;
a second haptic system transducer having a second transducer first end and a second transducer second end;
a fourth switch having a fourth switch first end and a fourth switch second end;
a fifth switch having a fifth switch first end and a fifth switch second end;
a sixth switch having a sixth switch first end and a sixth switch second end;
wherein the first current source first end is connected to the voltage source;
wherein the first current source second end is connected to the trickle capacitor first end and is connected to the first switch first end, and is connected to the fourth switch first end;
wherein the first switch second end is connected to the third switch first end and is connected to the second switch first end and is connected to the first transducer first end;
wherein the fourth switch second end is connected to the sixth switch first end and is connected to the fifth switch first end and is connected to the second transducer first end;
wherein the third switch second end is connected to the first storage capacitor first end;
wherein the sixth switch second end is connected to the second storage capacitor first end;
wherein the second switch second end, the fifth switch second end, the first transducer second end, the second transducer second end, the first storage capacitor second end, the second storage capacitor second end, and the trickle capacitor second end are connected to the voltage sink.

10. The circuit as in claim 9 wherein the current source, the first switch, the second switch, the third switch, the fourth switch, the fifth switch and the sixth switch are located on an integrated circuit.

11. The circuit as in claim 8, wherein when the first switch and the fourth switch are closed charge accumulated on the trickle capacitor is transferred onto the first transducer and second transducer.

12. The circuit as in claim 8, wherein the first switch and the fourth switch are open, the current from the current source flows into the trickle capacitor.

13. The circuit as in claim 8, wherein the second switch and the fifth switch are closed, the charge on the first transducer and the second transducer is discharged into the voltage sink.

14. The circuit as in claim 8, wherein the second switch and the fifth switch are open, the first transducer and the second transducer are prevented from discharging into the voltage sink.

15. A circuit comprising:
a voltage source;
a voltage sink;
a current source having a current source first end and a current source second end;
a trickle capacitor having a trickle capacitor first end and a trickle capacitor second end;
a storage capacitor having a storage capacitor first end and a storage capacitor second end;
a haptic system transducer having a transducer first end and a transducer second end;
a first switch having a first switch first end and a first switch second end;
a second switch having a second switch first end and a second switch second end;
a third switch having a third switch first end and a third switch second end;
a first Zener diode having a first anode and a first cathode;
a second Zener diode having a second anode and a second cathode;

wherein the current source first end is connected to the voltage source;

wherein the current source second end is connected to the trickle capacitor first end and is connected to the first switch first end and is connected to the first cathode;

wherein the first switch second end is connected to the third switch first end and is connected to the second switch first end and is connected to the second cathode and is connected to the transducer first end;

wherein the third switch second end is connected to the storage capacitor first end; and wherein the second switch second end, the transducer second end, the storage capacitor second end, the first anode, the second anode and the trickle capacitor second end are connected to the voltage sink.

16. The circuit as in claim 15, wherein when the first switch is closed, charge accumulated on the trickle capacitor is transferred onto the transducer.

17. The circuit as in claim 16, wherein when the first switch is closed, current from the current source is also provided to the trickle capacitor and the transducer.

18. The circuit as in claim 15, wherein when the first switch is open the current from the current source flows into the trickle capacitor.

19. The circuit as in claim 15, wherein when the second switch is closed, the charge on the transducer is discharged into the ground sink.

20. The circuit as in claim 15, wherein when the second switch is open, the transducer is prevented from discharging into the ground sink.

* * * * *